(12) United States Patent
Olesinski et al.

(10) Patent No.: US 8,670,454 B2
(45) Date of Patent: Mar. 11, 2014

(54) DYNAMIC ASSIGNMENT OF DATA TO SWITCH-INGRESS BUFFERS

(75) Inventors: Wladyslaw Olesinski, Pleasanton, CA (US); Hans Eberle, Sunnyvale, CA (US); Nils Gura, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 499 days.

(21) Appl. No.: 12/412,233

(22) Filed: Mar. 26, 2009

(65) Prior Publication Data

US 2010/0246590 A1 Sep. 30, 2010

(51) Int. Cl.
*H04L 12/28* (2006.01)

(52) U.S. Cl.
USPC ........... 370/412; 370/359; 370/400; 370/413; 370/429; 710/56; 710/310; 365/189.05

(58) Field of Classification Search
None
See application file for complete search history.

(56) References Cited

U.S. PATENT DOCUMENTS

| 6,647,019 | B1* | 11/2003 | McKeown et al. | 370/422 |
| 7,065,580 | B1* | 6/2006 | Eberle et al. | 709/232 |
| 2004/0004961 | A1* | 1/2004 | Lakshmanamurthy et al. | 370/364 |
| 2005/0047338 | A1* | 3/2005 | Hoffman et al. | 370/230 |
| 2005/0053077 | A1* | 3/2005 | Blanc et al. | 370/395.72 |
| 2007/0110087 | A1* | 5/2007 | Abel et al. | 370/412 |
| 2007/0237082 | A1* | 10/2007 | Han | 370/235 |
| 2007/0253439 | A1* | 11/2007 | Iny | 370/413 |
| 2007/0291535 | A1* | 12/2007 | Eberle et al. | 365/174 |

* cited by examiner

*Primary Examiner* — Nicholas Sloms

(74) *Attorney, Agent, or Firm* — Park, Vaughan, Fleming & Dowler LLP; Steven E. Stupp

(57) ABSTRACT

Embodiments of a system that includes a switch and a buffer-management technique for storing signals in the system are described. In this system, data cells are dynamically assigned from a host buffer to at least a subset of switch-ingress buffers in the switch based at least in part on the occupancy of the switch-ingress buffers. This buffer-management technique may reduce the number of switch-ingress buffers relative to the number of input and output ports to the switch, which in turn may overcome the limitations posed by the amount of memory available on chips, thereby facilitating large switches.

16 Claims, 4 Drawing Sheets

DYNAMIC ASSIGNMENT OF DATA TO SWITCH-INGRESS BUFFERS

BACKGROUND

1. Field of the Invention

The present invention generally relates to switches and techniques for communicating signals through switches. More specifically, the present invention relates to techniques for buffering of data in a switch using dynamically assigned switch-ingress buffers.

2. Related Art

To avoid head-of-line blocking in switches, buffer-management techniques, such as Virtual Output Queues (VOQs), are commonly used. A typical VOQ includes a buffer which is associated with an input port to a switch. This buffer temporarily stores data intended for one or more output ports in the switch. Moreover, there usually is a fixed relationship between a given buffer and one or more associated output ports. Thus, in VOQs, there may exist separate queues for different groups of output ports.

However, assuming a separate VOQ per output port, the number of VOQs grows quadratically as the number of input and output ports increases. This makes it difficult to use VOQs in large switches, such as switches with hundreds of input and output ports, and terabit-per-second throughput.

Hence, what is needed is a buffer-management technique without the problems described above.

SUMMARY

One embodiment of the present invention provides a system that includes: input nodes to receive data cells, host buffers, a switch and output nodes to output the data cells. Note that a given host buffer is coupled to a given input node. Moreover, the switch includes switch-ingress buffers that are at least selectively coupled to the host buffers, and a switching fabric to selectively couple one or more of the switch-ingress buffers to one or more of the output nodes. In the system, data cells are dynamically assigned from the given host buffer to a given switch-ingress buffer based at least in part on occupancy of the switch-ingress buffers.

In some embodiments, the system includes control logic which dynamically assigns the data cells to the given switch-ingress buffer. At least a portion of the control logic may be included in the switch.

This system may include a line card which includes the host buffers. Furthermore, the given host buffer may include data cells destined for more than one of the output nodes. While the data cells may be dynamically assigned to the given switch-ingress buffer, in some embodiments the given host buffer may only be able to assign data cells to a fixed subset of the switch-ingress buffers. For example, the given host buffer may be a virtual output queue with fixed coupling to one or more of the switch-ingress buffers, and may be able to dynamically assign the data cells to one or more of the one or more switch-ingress buffers. Alternatively, the given host buffer may be able to dynamically assign the data cells to an arbitrary switch-ingress buffer.

Moreover, the given switch-ingress buffer may include data cells destined for more than one of the output nodes. Thus, a number of the switch-ingress buffers coupled to the given input node may be less than a number of the output nodes. Note that the switch-ingress buffers may be identical to each other.

In some embodiments, the switch includes multiple chips, where adjacent chips in the multiple chips may communicate information with each other via proximity communication.

In order to maintain an order of the data cells in a data stream, if a data cell associated with the data stream is currently in one of the switch-ingress buffers, a subsequent data cell associated with the data stream may be assigned to the one of the switch-ingress buffers. However, in the absence of the data cell associated with the data stream in one of the switch-ingress buffers, the subsequent data cell associated with the data stream may be assigned to one of the switch-ingress buffers, which can be an arbitrary one of the switch-ingress buffers. Note that the data stream may include a sequence of data cells which are received on one or more of the input nodes and which are output on one or more of the output nodes. More generally, the sequence of data cells may be received from a first location and may be output to a second location. These locations may be addresses in a network hierarchy.

In some embodiments, the assignment of the data cells involves transmitting credit tokens from the switch-ingress buffers to the host buffers.

Another embodiment provides a computer system that includes the system.

Another embodiment provides a method for selectively coupling data cells from one or more input nodes to one or more output nodes, which may be performed by a system. During operation, the system receives data cells on the input nodes, and stores the data cells in host buffers, where a given host buffer is coupled to a given input node. Then, the system dynamically assigns the data cells from the host buffers to switch-ingress buffers, where the data cells are dynamically assigned from the given host buffer to a given switch-ingress buffer based at least in part on occupancy of the switch-ingress buffers. Next, the system stores the data cells in the switch-ingress buffers, and selectively couples the data cells from the switch-ingress buffers to corresponding output nodes using a switching fabric.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a system that includes a switch and a buffer-management technique for storing signals in the system are described. In this system, data cells are dynamically assigned from a host buffer to at least a subset of switch-ingress buffers in the switch based at least in part on the occupancy of the switch-ingress buffers. This buffer-management technique may reduce the number of switch-ingress buffers relative to the number of input and output ports to the switch, which in turn may overcome the limitations posed by the amount of memory available on chips, thereby facilitating large switches.

By reducing the amount of on-chip memory needed to implement large switches, this buffer-management technique (which is henceforth referred to as dynamic switch buffer management or DSBM) can offer: improved switch throughput at high loads; more flexibility relative to existing buffer-management techniques; and, if the number of input and output ports is not an integer multiple of the number of switch-ingress buffers, increased fairness in the handling of different data streams. Furthermore, DSBM may be less complicated than existing buffer-management techniques, and can be implemented in single-stage switches or in multi-chip switches.

Figure 1:
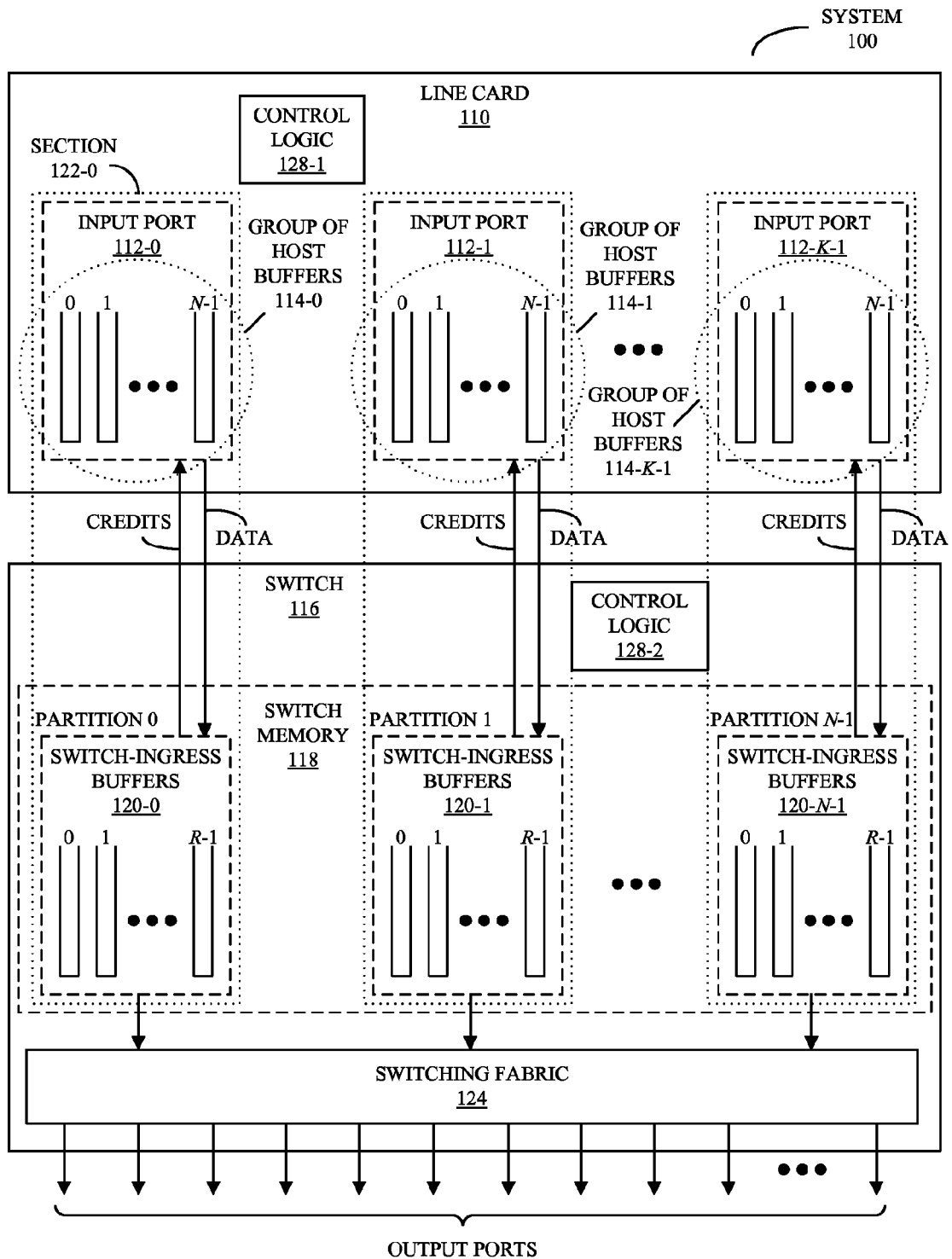
FIG. 1 is a block diagram illustrating a system that includes a line card and a switch in accordance with an embodiment of the present invention.

We now describe embodiments of the system. FIG. 1 presents a block diagram illustrating a system 100 that includes one or more line cards, such as a line card 110, and a switch 116. Line card 110 has K input nodes or ports 112. In some embodiments, each input port is associated with a corresponding group of host buffers 114, which each may include N VOQs, one for each of N output nodes or ports 126. However, in other embodiments, the VOQs in a given group of host buffers may be associated with more than one of output ports 126 (i.e., there may be fewer than N VOQs in each group of host buffers). Furthermore, as described further below, in some embodiments, there may not be a fixed relationship or correspondence between host buffers in the groups of host buffers 114 and switch-ingress buffers 120 in switch memory 118 or output ports 126 (e.g., the host buffers may be configured differently than VOQs).

In general, K is greater than zero and less than or equal to N. Note that depending on the architecture and application of switch 116, the term 'line card' may encompass a network interface card (NIC) or a host computer. Generally, a line card is a device that is physically separate from switch 116 and has a relatively high memory capacity and high processing power.

Line card 110 is at least selectively coupled to switch-ingress buffers 120 in partitions in switch memory 118. This switch memory may be on the same chip as switching fabric 124 (which selectively couples data cells from one or more of the switch-ingress buffers 120 to one or more of output ports 126), or can be located on a separate chip (e.g., a fabric interface chip). Moreover, there may be one partition for each of input ports 112. (However, in other embodiments, there are fewer partitions than input ports 112.) Assuming a cell-based switching fabric 124, each partition may include R switch-ingress buffers that store data cells arriving from line card 110 before the data cells are forwarded to switching fabric 124. In some embodiments, the R switch-ingress buffers may be identical in size and organization to each other.

Switch-ingress buffers in each partition can be organized as single first-in first-out (FIFO) buffers or multi-FIFO buffers. In a multi-FIFO buffer, there is a separate FIFO for each flow, where a flow is defined as a sequence of cells coming from a given VOQ. Alternatively, a flow may be defined by a pair of addresses in a network hierarchy.

In single FIFO buffers, a data cell from the head of a given switch-ingress buffer is available. In contrast, in multi-FIFO buffers, any data cell from the given switch-ingress buffer can be accessed. Note that if switch-ingress buffers 120 include R equal to N queues for each of input ports 112, these buffers may be equivalent to VOQs, with one VOQ in each partition for each of output ports 126 (i.e., each of the switch-ingress buffers would have a fixed relationship with a corresponding output port).

As described further below, configurations with N VOQs in switch-ingress buffers in each partition may be difficult to implement. In the discussion that follows, configurations with fewer switch-ingress buffers in each partition (i.e., R less than N) that assure a good performance are described. As a consequence, some of switch-ingress buffers 120 for one or more partitions may be shared by data cells going to different output ports 126.

In line card 110, consider one input port, e.g., input port 112-0, and its corresponding VOQs in one of groups of host buffers 114, such as group of host buffers 114-0. Furthermore, in switch memory 118, consider a partition with R switch-ingress buffers 120-0 that collect data cells assigned from input port 112-0. These two elements, VOQs for a given input port and the corresponding switch-ingress buffers 120-0 in switch memory 118, define one of the sections. In switch 116, there may be K sections, one for each of input ports 112. For the sake of simplicity, the discussion below focuses on section 122-0.

As an alternative to VOQs in switch 116 (i.e., to a fixed correspondence between switch-ingress buffers 120-0 in section 122-0 and output ports 126), in DSBM data cells may be dynamically assigned from at least a subset of group of host buffers 114-0 to at least a subset of switch-ingress buffers 120-0, based at least in part on the occupancy of one or more switch-ingress buffers in at least the subset of switch-ingress buffers 120-0. However, in some embodiments, data cells may by dynamically assigned from an arbitrary host buffer in group of host buffers 114-0 to an arbitrary switch-ingress buffer in switch-ingress buffers 120-0. As described further below, DSBM reduces the memory requirements in switch memory 118 by reducing the number of switch-ingress buffers in switch-ingress buffers 120.

Traffic between line card 110 and switch memory 118 may be regulated using credit flow control. With regard to input port 112-0, line card 110 may maintain R credit counters, one for each of switch-ingress buffers 120-0 in section 122-0. Each time a data cell is sent from a given one of these switch-ingress buffers to switching fabric 124, switch memory 118 may send a credit that specifies this switch-ingress buffer to line card 110. Once line card 110 receives the credit, it may increment the corresponding counter. In some embodiments, line card 110 may only be able to send another data cell to the given switch-ingress buffer if it has a corresponding credit. Note that the buffer sizes may be determined by the round-trip time between line card 110 and switch-ingress buffers 120-0.

In DSBM, several data structures may be maintained in line card 110, including integer array Avoq[0 . . . N−1] that maps VOQs in host buffers 114-0 to R switch-ingress buffers in switch-ingress buffers 120-0. For example, Avoq[5] equal to two means that data cells from VOQ 5 in group of host buffers 114-0, traveling to output port 5 in output ports 126, are stored in switch-ingress buffer 2 in switch-ingress buffers 120-0 on switch 116. Note that, if R is less than N, more than one VOQ may be mapped to the same switch-ingress buffer.

In addition, line card 110 may maintain an array Atm[0 . . . R−1] of elements that map R switch-ingress buffers 120-0 to N VOQs. In fact, an element of array Atm[j] is a structure that contains a field with a set of VOQs (specifically, their identifiers) from which a given switch-ingress buffer in switch memory 118 receives data cells. For example, Atm[2].voqs equal to {5,7} means that data cells arriving at switch-ingress buffer 2 come from VOQs 5 and 7. Note that the size of the set is limited in that the maximum cardinality of each set F equals N/R. In addition, an element of array Atm[j] includes: a field with the numbers of data cells (in switch-ingress buffer j) for each VOQ in Atm[j].voqs; and a field with the total occupancy of buffer j that cannot exceed buffer size Bt.

In some embodiments, the buffer-management technique for assigning a data cell to a switch-ingress buffer is performed on line card 110, for example, using control logic 128-1. (However, note that at least a portion of the control logic used in DSBM, such as control logic 128-2, may be included on switch 116.) In every data cell time (which is sometimes referred to as a slot), DSBM selects a non-empty VOQ i for service, for example, in a round-robin fashion. Then, DSBM retrieves the identifier Avoq[i] of a switch-ingress buffer in switch memory 118 that stores data cells from VOQ i.

We now distinguish two cases. In the first case, this identifier is invalid, which means that the data cell in VOQ i is the first data cell in the flow to destination i in a certain period of time. (This period may be long enough for all data cells destined for output port i to have drained from switch memory 118, and for line card 110 to be notified.) As a consequence, DSBM finds a switch-ingress buffer j in switch memory 118 that has the lowest occupancy among those switch-ingress buffers that received data cells from fewer than F VOQs. If no such switch-ingress buffer is found, i.e., if all switch-ingress buffers that receive data cells from fewer than F VOQs are full, the data cell is blocked. Otherwise, it is forwarded to switch-ingress buffer j, and the buffer-management technique updates its data structures: it sets Avoq[i] equal to j, it increments the total occupancy and the number of data cells from VOQ i in structure Atm[j], and it appends the identifier i of the VOQ to Atm[j].voqs.

In the second case, in which a value retrieved from Avoq[i] is a valid identifier of switch-ingress buffer j, DSBM checks if it is full (e.g., if the total occupancy of switch-ingress buffer j is Bt). If yes, the data cell is blocked. Otherwise, the data cell is forwarded, and the total occupancy, as well as the number of data cells from VOQ i in structure Atm[j], are incremented. This approach, in which subsequent data cells associated with a data stream may be dynamically assigned to switch-ingress buffers that currently include one or more previous data cells in the data stream, may help maintain an order of the data cells in the data stream. Note that the data stream may include a sequence of data cells which are received on one or more of the input ports 112 and which are output on one or more of the output ports 126. More generally, the sequence of data cells may be received from a first location and may be output to a second location. These locations may refer to network addresses.

Moreover, note that if the data cell is blocked (because its corresponding switch-ingress buffer is full), DSBM may try to forward a data cell from the next non-empty VOQ.

We now describe switch memory 118 and its operation. As noted previously switch-ingress buffers 120-0 include R switch-ingress buffers. Every time a data cell arrives from VOQ i, it is stored in selected switch-ingress buffer j. Note that the switch-ingress buffer cannot overflow because the credits make sure that line card 110 cannot send more data cells than can be accepted by a switch-ingress buffer in switch memory 118.

Every time a data cell departs from switch-ingress buffer j, switch memory 118 generates a credit that has the following fields: an identifier of switch-ingress buffer j that has just sent out a data cell; and an identifier of VOQ i which provided the departed data cell. This latter identifier may be read from the header of the departing data cell.

When line card 110 receives a credit, it reads the identifier j of the switch-ingress buffer that just sent out a data cell. Using the Atm array, line card 110 finds a list of VOQs whose data cells are in switch-ingress buffer j. In this list, line card 110 finds the VOQ identifier carried in the token, and decrements its corresponding data cell count. If the occupancy drops to zero, the corresponding VOQ i is removed from the set held in the data structure. In addition, Avoq[i] is set to a value indicating that VOQ i is no longer mapped in switch memory 118.

Figure 2:
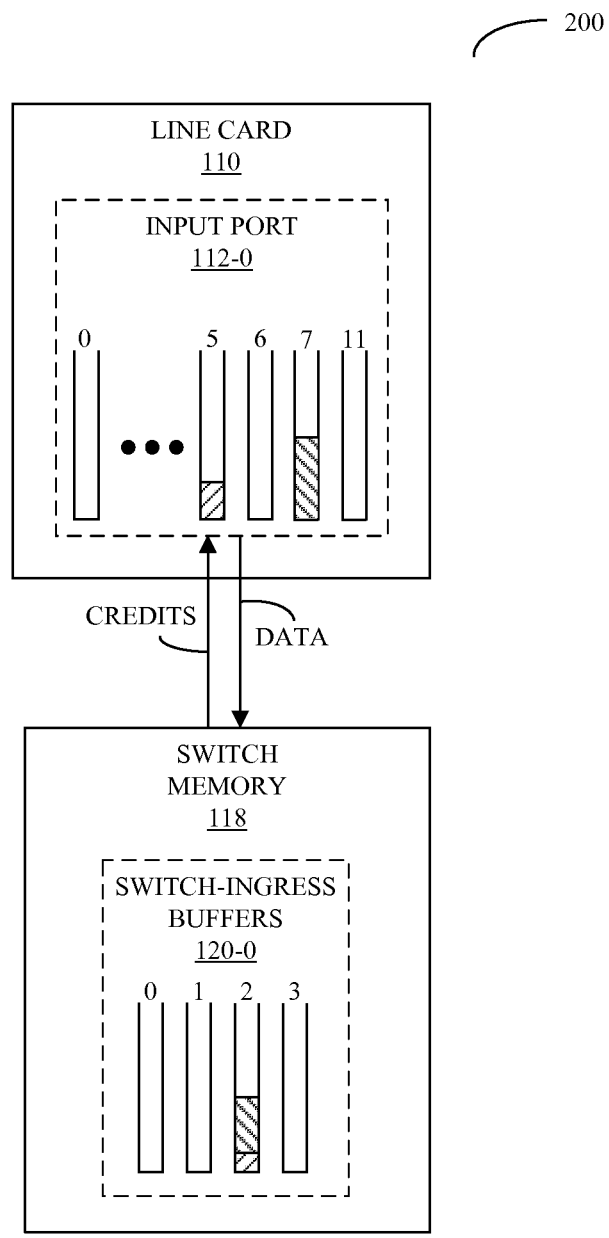
FIG. 2 is a block diagram illustrating selective coupling of data cells from the line card to switch-ingress buffers in accordance with an embodiment of the present invention.

FIG. 2 presents a block diagram 200 illustrating selective coupling of data cells from line card 110 to switch-ingress buffers 120-0. Line card 110 maintains N equal to twelve VOQs, and switch memory 118 has R equal to four switch-ingress buffers, which means that a single switch-ingress buffer may receive data cells from up to F equal to three (N/R) VOQs. VOQs 5 and 7 are not empty. Assume that these VOQs forward their data cells to switch-ingress buffer 2, so Avoq[5] and Avoq[7] each equal two.

In this example, the buffer size Bt equals ten. It currently stores three data cells from VOQ 5, and six data cells from VOQ 7. Therefore, assuming that line card 110 has up-to-date information about switch-ingress-buffer occupancies in switch memory 118, Atm [2] stores VOQ identifiers 5 and 7, the numbers of data cells three and six, and the total occupancy of nine.

If a data cell is sent from the head of switch-ingress buffer 2, this decrements the number of data cells from VOQ 5 from three to two. As a consequence, a credit with the following fields is generated: 2 (the switch-ingress buffer identifier) and 5 (the identifier of a VOQ whose data cell has left the switch-ingress buffer, read from the header of the data cell). When the credit arrives at line card 110, the stored number of data cells from VOQ 5 and the stored total occupancy of switch-ingress buffer 2 in switch memory 118 in Atm[2] each are decremented.

In contrast with existing buffer-management techniques, the mapping of data cells to switch-ingress buffers 120-0 is dynamic. Thus, rather than, for example, using a fixed mapping that always sends data cells from VOQs 0, 4 and 8 to switch-ingress buffer 0, DSBM will find the least occupied switch-ingress buffers, and will try to forward data cells to three different buffers. This buffer-management technique may decrease head-of-line blocking if switch-ingress buffers 120-0 are implemented as single FIFO buffers, and may lower delays regardless of whether switch memory 118 is implemented as a single FIFO buffers or a multi-FIFO buffer.

Note that switch 116 (FIG. 1) may not have to include an identifier of a VOQ in the credit. For example, line card 110 could have a separate data structure that would record an order in which data cells have departed to particular switch-ingress buffers. Knowing this order, line card 110 would know which switch-ingress buffer is associated with a given arriving credit from switch 116 (FIG. 1). However, this approach may require additional data structures on line card 110, and it may be prone to credit losses and other corruptions. Also note that the complexity of DSBM may be largely in line card 110, and not in switch 116. This may be advantageous, because memory and processing power are likely to be far greater on the former.

In some embodiments, in an extension of DSBM, the selection of a switch-ingress buffer is further refined. This extension, like DSBM, may execute on line card 110 using its data structures as a proxy of what is happening in switch memory 118. One difference is that, in the extension, data cells may be selected from VOQs based at least in part on fill level of the switch-ingress buffers 120 (FIG. 1) in switch 116 (FIG. 1), rather than serving the VOQs round robin. Specifically, each of the R switch-ingress buffers may be scanned in a round-robin fashion, and the VOQ that, so far, has contributed least to that switch-ingress buffer may be selected. For example, this switch-ingress buffer may be selected by examining the Atm data structure on line card 110 (note that the entire technique may execute on line card 110).

In other words, let bi be the number of data cells in switch-ingress buffer j coming from VOQ i. Assume that there are data cells from f less than or equal to F VOQs in this buffer. Then, the buffer-management technique may select VOQ i such that bi is less than or equal to bm for all m not equal to i. Translating this into operations on data structures kept by line card 110, the buffer-management technique may select the smallest data cell count of Atm[j] and match it with the corresponding VOQ identifier. Using the example from FIG. 2, and assuming switch-ingress buffer j equal to two, the technique will select VOQ 5 because it has two data cells in the switch-ingress buffer (which is less than the six data cells in VOQ 7).

Note that the idea behind this buffer-management technique is to operate from a different 'perspective.' Instead of arbitrating between VOQs, it looks at the switch-ingress buffers and tries to select the 'best' traffic for those switch-ingress buffers from the mapped VOQs. Specifically, it assures that, if possible, each switch-ingress buffer has data cells from many VOQs. If the switch-ingress buffer is implemented as multi-FIFO buffers, the scheduler will 'see' data cells addressed to many output ports. This may improve the quality of scheduling decisions (and reduce delays) because the scheduler will have more VOQs and data cells from which to choose.

We now describe simulations of DSBM running on line card 110, following roughly system 100 in FIG. 1. Simulations were performed with switch-ingress buffers 120 in switch memory 118 implemented as single FIFO buffers and multi-FIFO buffers. Scheduling in the simulation used a so-called wrapped wave front arbiter (WWFA) that decides which switch-ingress buffers 120 are served in each slot. In addition, credit flow control between line card 110 and switch 116 was modeled.

Note that if switch-ingress buffers 120 are implemented as single FIFO buffers, the scheduler can access data cells located only at the heads of the switch-ingress buffers 120. However, if switch-ingress buffers 120 are implemented as multi-FIFO buffers, the scheduler can access any data cell in any switch-ingress buffer.

In the simulations, system 100 included: N equal to 128 output ports 126, L equal to 64-byte data cells, 3-byte credit tokens, a port rate of 1 Gbps and a 30-meter cable that connects line card 110 with switch 116. Moreover, switch-ingress buffers 120 had a size Bt of four data cells, which is equivalent to the round-trip time incurred by credit flow control.

Furthermore, three types of data traffic were considered: Bernoulli-distributed traffic, bursty on/off traffic, and modulo-biased traffic. In Bernoulli traffic, destinations of data cells were uniformly distributed. In on/off traffic, 'on' and 'off' periods were exponentially distributed. Moreover, the 'on' period (ton) had a mean length of ten data cells, and the mean length of the 'off' period (toff) was adjusted depending on load λ as $$t_{off} = \frac{t_{on}(1-\lambda)}{\lambda}.$$

Finally, in modulo-biased traffic, input port i sent data traffic to output port (i+x·R)·mod R, where x, which is greater than or equal to zero and less than F, is a random number selected in every slot (data cell time). This traffic pattern may be unfavorable to existing buffer-management techniques that assign output ports 126 to switch-ingress buffers 120 in exactly the manner described here. In particular, these existing buffer-management techniques will still use the same congested switch-ingress buffer, even though other switch-ingress buffers may be empty.

In the simulations, latency incurred by data cells was measured from the moment the data cells enter a VOQ to the moment the data cells leave the scheduler module. This includes: the latency of switch-ingress-buffers 120, the time data cells spend in VOQs in line card 110, scheduler latency, and forwarding time on the connecting links. Note that this latency may grow without bound if an output port is overbooked. This is because, unlike switch-ingress buffers 120, VOQs in groups of host buffers 114 were not bounded in the simulations. Consequently, in case of congestion, their occupancies grew without bound. In the simulations, latencies that grew rapidly indicated that the arriving data cells could not be processed at the line rate, given: the load, the buffer-management technique and the associated control technique.

In the first group of simulations, latency (expressed in slots or data cell times) was determined as a function of load for a system with on/off data traffic for DSBM. In these simulations, there were R equal to 4, 8 and 16 switch-ingress buffers 120 (FIG. 1) in each partition, organized as single FIFO buffers. In addition, results for a typical VOQ system with 128 switch-ingress buffers in switch 116 (FIG. 1) per input port were simulated.

For lighter loads (0.4-0.5), the buffer-management technique and the number of switch-ingress buffers 120 (FIG. 1) do not matter (latencies were around 15-20 slots). However, as loads get larger, the differences between the buffer-management techniques and switch-ingress-buffer counts became more important. In particular, with an increasing number of switch-ingress buffers, head-of-line blocking became less frequent, which lowered latencies. In each case, beyond a certain load, switch 116 (FIG. 1) was unable to process all data cells at the line rate, and data cells accumulated in VOQs and latencies grew without bound (in simulations with larger values of R, the maximum load before the latency increased was larger).

These simulations illustrated the benefits of DSBM. For example, for R equal to four, a load of 0.6, the latency of DSBM was 3 times smaller than an existing buffer-management technique (33 versus 100 slots). Moreover, for higher loads, the latencies of the existing buffer-management technique grew without bound, indicating that head-of-line blocking introduced by the existing buffer-management technique made it impossible for switch 116 (FIG. 1) to operate at the line rate. In contrast, DSBM still operated up to a load of about 0.65.

Furthermore, DSBM results for R equal to sixteen were not much worse than results of a VOQ system that required eight times more switch-ingress buffers 120 (FIG. 1) in switch 116

(FIG. 1) than DSBM. In particular, for loads of up to 0.85, these two buffer-management techniques had virtually identical latencies under bursty on/off traffic.

In a second group of simulations, latency versus load with these buffer-management techniques was determined for a system with on/off data traffic and with switch-ingress buffers 120 (FIG. 1) organized as multi-FIFO buffers. As expected, the overall performance of each buffer-management technique was better. In particular, when the scheduler considers all data cells in all of switch-ingress buffers 120 (FIG. 1), and not only data cells stored at the heads of the switch-ingress buffers 120 (FIG. 1), then the quality of scheduling improves because the scheduler has more input-output assignments from which to choose. This immediately results in a higher throughput of switch 116 (FIG. 1) and lower latencies. For example, for a load of 0.6, the latency was around 20 slots for R between four and sixteen.

Note that the benefits of the multi-FIFO-buffer organization of switch-ingress buffers 120 (FIG. 1) were most pronounced when there are just few of them (i.e., R is small). When R equals sixteen, the scheduler considers data cells from many VOQs anyway (when compared with smaller R), so the ability to choose additional data cells brings smaller benefits.

For uniform data traffic, results for different switch-ingress-buffer counts and buffer-management techniques were similar. This is because uniform data traffic is more 'friendly,' distributing the load evenly among all output ports 126 (FIG. 1). Consequently, all of the buffer-management techniques achieve better performance (lower latencies) for a given load.

In a third group of simulations, latency versus load was determined for a system with modulo-biased data traffic when switch-ingress buffers 120 (FIG. 1) are single FIFO buffers. As expected, in this type of data traffic, the performance of DSBM was significantly better than the performance of the existing buffer-management technique. For example, for a load of 0.6 and R equal to four switch ingress-buffers per partition, DSBM has a latency ten-times lower than the existing buffer-management technique (3.5 slots versus 35 slots). As a consequence, DSBM could dynamically select switch-ingress buffers and distribute data traffic over multiple switch-ingress buffers, not only just their subset, which resulted in lower latency and higher throughput.

In this third group of simulations, latencies of the VOQ system were much lower than DSBM. This is because when modulo-biased traffic is used when R equals N, input port i always sends data cells to output port i so there is no contention.

Simulation results for switch-ingress buffers 120 (FIG. 1) organized as multi-FIFO buffers were similar to those in the third group of simulations. As was the case with on/off data traffic, multi-FIFO buffers improved the performance especially when the number of switch-ingress buffers 120 (FIG. 1) was small.

We now consider flexibility, fairness, and memory savings that result from reducing the number of switch-ingress buffers. If the switch-ingress-buffer structure in switch 116 (FIG. 1) replicates the VOQ structure on line card 110 (FIG. 1), then there needs to be memory for $B \cdot N^2$ data cells, where B is the size of switch-ingress buffers 120 (FIG. 1) expressed in data cells. Using R less than N switch-ingress buffers for each input port, the memory requirement drops to $B \cdot N \cdot R$, that is, the memory requirements is reduced N/R times.

Using the same environment as in the simulations, having a VOQ structure with N switch-ingress buffers per input port replicated on switch 116 (FIG. 1) uses 4 MB of memory. Moreover, when switch 116 (FIG. 1) has R equal to sixteen switch-ingress buffers per input port (or partition), it uses 0.5 MB of memory. For four and eight switch-ingress buffers, the corresponding amounts of memory are 0.125 MB and 0.25 MB, respectively.

Assuming a chip size of 100 mm$^2$, and 90-nm chip technology, the memory capacity of this chip is about 2 MB, which is clearly not enough. Therefore, reducing the number of switch-ingress buffers 120 on switch 116 (FIG. 1) can bring the memory size down to an implementable level.

Other advantages of DSBM are simplicity and, when compared with the existing buffer-management technique, more flexibility in choosing the number of buffers, and better fairness. For example, DSBM can handle non-integer ratios of the number of input and output ports to the number of switch-ingress buffers. In particular, in DSBM, switch-ingress buffers 120 (FIG. 1) create a pool from which line card 110 (FIG. 1) select the least congested switch-ingress buffers, regardless of their number and the destinations of the flowing data traffic.

We now describe a possible implementation of switch-ingress buffers 120 (FIG. 1) as single FIFO buffers and multi-FIFO buffers. Switch-ingress buffers 120 (FIG. 1) can be implemented in one physical memory. Providing sufficient memory bandwidth to match the port bandwidth can be straightforward, e.g., a 10 Gbps line rate can be supported with a 32-bit memory at 312.5 MHz, or a 64-bit memory at 156.25 MHz. Moreover, the memory can be divided into R regions, which correspond to the R switch-ingress buffers per partition. All these regions may have equal sizes and can use contiguous memory space for each switch-ingress buffer. In addition to the memory region, each switch-ingress buffer may have a read and write pointer associated with it to implement a single FIFO buffer.

Implementing switch-ingress buffers 120 (FIG. 1) as multi-FIFO buffers should also have reasonable complexity. Rather than using read and write pointers, each of the switch-ingress buffers can have F equal to N/R queues implemented as linked lists (one list for each of the data streams with data cells going to a specific output port). That is, each data cell in memory may have a pointer to the address of the next data cell for the same output port of switch 116 (FIG. 1).

Furthermore, the management of the memory regions can be combined with the credit technique. For example, each credit on line card 110 (FIG. 1) may correspond to a particular address in the memory. When line card 110 (FIG. 1) sends a data cell to switching fabric 124 (FIG. 1), it may use a credit for an available address, and this credit may be returned to line card 110 (FIG. 1) when the data cell is read from the memory. Line card 110 (FIG. 1) may need to maintain a list of available addresses, which could be implemented as a single FIFO buffers. It may further need to store a mapping of output ports 126 (FIG. 1) to regions and may need to keep track of how many addresses have been used for each region, which could be implemented with R counters.

A region counter may be initialized with the number of data cells that a region can hold (Bt). It may be decremented when a data cell mapped to the corresponding region is sent to switch fabric 124 (FIG. 1). Furthermore, it may be incremented when the credit is returned to line card 110 (FIG. 1). By ensuring that the counters stay greater than zero, the regions are limited to the size of Bt. To efficiently support this technique, the credits may further contain the region number, which may be stored in the memory together with the data cell and the pointer to the next data cell.

Note that the regions or buffers are now 'virtual,' i.e., they do not correspond to contiguous areas in memory but rather to a limited number of discontinuous addresses. This implementation of the memory further makes it possible to dynamically change the size of individual regions by reassigning a credit of one region to another region.

In some embodiments, switch 116 (FIG. 1) includes multiple chips. Moreover, at least adjacent chips in the multiple chips may communicate information with each other via proximity communication. Proximity communication uses capacitive, inductive, magnetic, optical and/or conductive inter-chip coupling to communicate signals from one chip to another. For example, in capacitive proximity communication, capacitors may be integrated directly on the chip dies. As a consequence, chip input/output density may be improved by up to two orders of magnitude.

Proximity communication is one of several emerging high-speed chip interconnect technologies that have the potential to drastically change the architecture of switches. Other promising technologies include: CMOS-compatible photonics that facilitate the integration of optical links directly onto chip dies using standard cost-effective chip manufacturing processes; and chip stacking using through-silicon vias to connect multiple chips.

Figure 3:
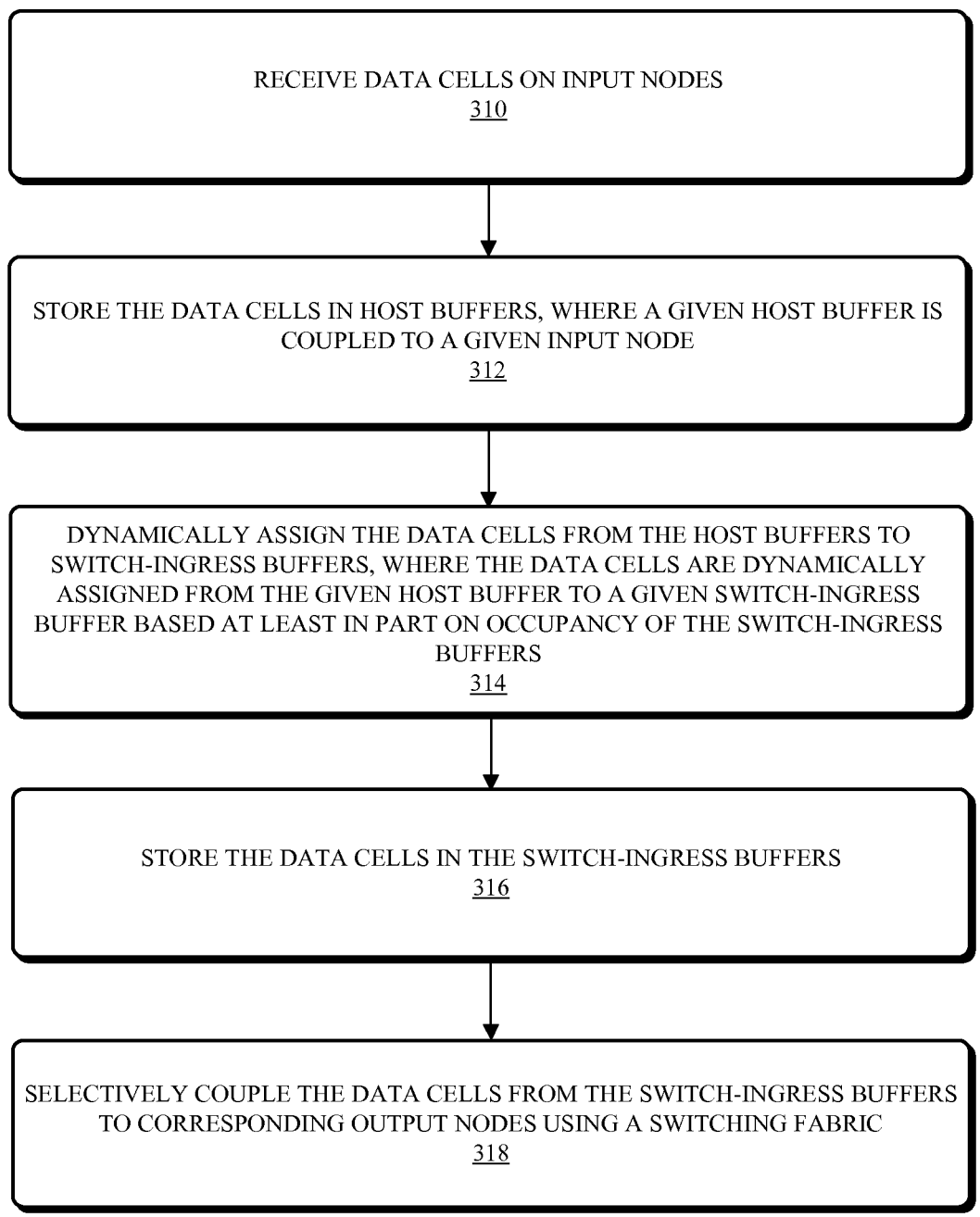
FIG. 3 is a flowchart illustrating a method for selectively coupling data cells from one or more input nodes to one or more output nodes in accordance with an embodiment of the present invention.

We now describe embodiments of a technique for communicating signals in a system. FIG. 3 presents a flowchart illustrating a method 300 for selectively coupling data cells from one or more input nodes to one or more output nodes, which may be performed by a system (such as system 100 in FIG. 1). During operation, the system receives data cells on the input nodes (310), and stores the data cells in host buffers (312), where a given host buffer is coupled to a given input node. Then, the system dynamically assigns the data cells from the host buffers to switch-ingress buffers (314), where the data cells are dynamically assigned from the given host buffer to a given switch-ingress buffer based at least in part on occupancy of the switch-ingress buffers. Next, the system stores the data cells in the switch-ingress buffers (316), and selectively couples the data cells from the switch-ingress buffers to corresponding output nodes using a switching fabric (318).

Note that in some embodiments of method 300 there may be additional or fewer operations. Moreover, the order of the operations may be changed and/or two or more operations may be combined into a single operation.

Figure 4:
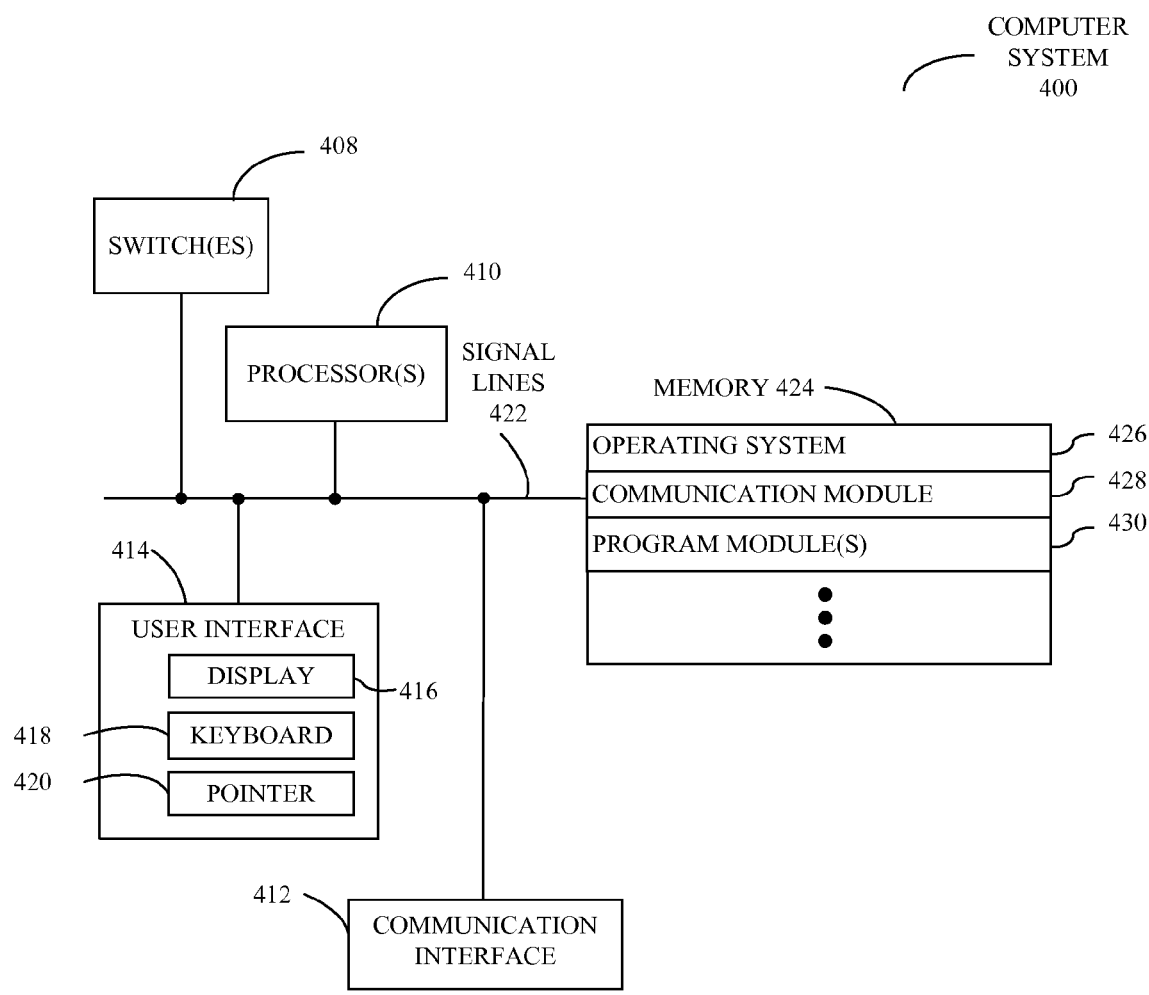
FIG. 4 is a block diagram illustrating a computer system in accordance with an embodiment of the present invention.

We now describe embodiments of a computer system that includes one or more of the switches. FIG. 4 presents a block diagram illustrating a computer system 400, which includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer, such as a mouse 420.

Computer system 400 may include memory 424, which may include high speed random access memory and/or non-volatile memory. More specifically, memory 424 may include ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. Moreover, memory 424 may also store communications procedures (or a set of instructions) in a communication module 428. These communication procedures may be used for communicating with one or more computers, devices and/or servers, including computers, devices and/or servers that are remotely located with respect to the computer system 400.

Memory 424 may also include one or more program modules (or a set of instructions) 430. Instructions in the program modules 430 in the memory 424 may be implemented in a high-level procedural language, an object-oriented programming language, and/or in an assembly or machine language. The programming language may be compiled or interpreted, i.e., configurable or configured, to be executed by the one or more processing units 410.

Computer system 400 may include one or more switches 408 that include the switch described in the previous embodiments. Consequently, in some embodiments, the system described previously may include computer system 400.

In some embodiments, the functionality of the computer system 400 may be implemented more in hardware and less in software, or less in hardware and more in software, as is known in the art. For example, some or all of the functionality of the computer system 400 may be implemented in one or more application-specific integrated circuits (ASICs) and/or one or more digital signal processors (DSPs).

Although the computer system 400 is illustrated as having a number of discrete items, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. For example, one or more switches 408 may be included in a computer system which is at one location or which is distributed over multiple, geographically dispersed locations. Consequently, instructions and/or data associated with processes or jobs that are executed by the computer system may be received and communicated within the computer system over a network, such as: the Internet or World Wide Web (WWW), an intranet, a local area network (LAN) (such as IEEE 802.11 or WiFi), a wide area network (WAN) (such as IEEE 802.16 or WIMAX), a metropolitan area network (MAN), a satellite network, a wireless network (such as a cellular telephone network), an optical network, and/or a combination of networks or other technology enabling communication between computing systems or electronic devices.

Additionally, note that one or more switches 408 may be used in a variety of applications, including: data centers, networks, and/or computer systems (such as multi-processor computer systems). For example, the switches may be included in a backplane that is coupled to multiple processor blades, or the switch may couple different types of components (such as: processors, memory, input/output devices, and/or peripheral devices). These switches may also perform the functions of: a hub, a bridge, and/or a router. Furthermore, switches 408 may operate at one or more layers in the open systems interconnection reference model, such as the physical layer (layer 1), the data link layer (layer 2), and/or the network layer (layer 3). Thus, in some embodiments switches 408 include a multi-layer switch.

In some embodiments, system 100 (FIG. 1) and/or computer system 400 include fewer components or additional components. Moreover, two or more components may be combined into a single component and/or the position of one or more components may be changed.

While the application of DSBM to switches has been used as an illustrative embodiment, this buffer-management technique is independent of a specific architecture. As such, DSBM can be readily used in other architectures that rely on input queuing.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system, comprising:
   input nodes to receive data cells;
   a linecard, which includes a set of host buffers, wherein the set of host buffers is coupled to a given input node;
   output nodes to output the data cells; and
   a switch which is physically separate from the linecard and which includes:
      a set of switch-ingress buffers coupled to the set of host buffers; and
      a switching fabric to selectively couple one or more of the switch-ingress buffers to one or more of the output nodes,
   wherein, for each data cell in at least some of the data cells, the system uses an occupancy of the switch-ingress buffers to dynamically determine a given switch-ingress buffer in the set of switch-ingress buffers to which the data cell is to be sent from a given host buffer in the set of host buffers, and
   wherein the linecard maintains a data structure that maps the given switch-ingress buffer to a set of virtual queues for one or more of the host buffers, wherein an entry for the data structure identifies the set of virtual queues from which the given switch-ingress buffer accepts data cells,
   wherein, if a data cell associated with a data stream is currently in one of the switch-ingress buffers, a subsequent data cell associated with the data stream is assigned to the one of the switch-ingress buffers; and
   wherein, in the absence of the data cell associated with the data stream in one of the switch-ingress buffers, the subsequent data cell associated with the data stream is assigned to one of the switch-ingress buffers, which can be an arbitrary one of the switch-ingress buffers.

2. The system of claim 1, further comprising control logic which dynamically assigns the data cells to the given switch-ingress buffer.

3. The system of claim 2, wherein at least a portion of the control logic is included in the switch.

4. The system of claim 2, wherein the assignment of the data cells involves transmitting credit tokens from the set of the switch ingress buffers to the set of the host buffers.

5. The system of claim 1, wherein the switch-ingress buffers in the set of switch ingress buffers are identical to each other.

6. The system of claim 1, wherein a number of the switch-ingress buffers coupled to the given input node is less than a number of the output nodes.

7. The system of claim 1, wherein the given host buffer includes data cells destined for more than one of the output nodes.

8. The system of claim 1, wherein each host buffer comprises a virtual output queue with fixed coupling to one or more of the switch-ingress buffers.

9. The system of claim 1, wherein the switch includes multiple chips; and
   wherein at least adjacent chips in the multiple chips communicate information with each other via proximity communication.

10. The system of claim 1, wherein the data stream includes a sequence of data cells which are received on one or more of the input nodes and which are output on one or more of the output nodes.

11. The system of claim 1, wherein the data stream includes a sequence of data cells which are received from a first location and which are output to a second location.

12. The system of claim 11, wherein the first location and the second location include addresses in a network hierarchy.

13. A computer system, comprising:
   input nodes to receive data cells;
   one or more components coupled to a given input node;
   a set of host buffers on a linecard, wherein the set of host buffers is coupled to the given input node;
   output nodes to output the data cells; and
   a switch which is separate from the linecard, and which includes:
      a set of switch-ingress buffers coupled to the set of host buffers; and
      a switching fabric to selectively couple one or more of the switch-ingress buffers to one or more of the output nodes, wherein, for each data cell in at least some of the data cells, the system uses an occupancy of the switch-ingress buffers to dynamically determine a given switch-ingress buffer in the set of switch-ingress buffers to which the data cell is to be sent from a given host buffer in the set of host buffers, and
   wherein the linecard maintains a data structure that maps the given switch-ingress buffer to a set of virtual queues for one or more of the host buffers, wherein an entry for the data structure identifies the set of virtual queues from which the given switch-ingress buffer accepts data cells,
   wherein, if a data cell associated with a data stream is currently in one of the switch-ingress buffers, a subsequent data cell associated with the data stream is assigned to the one of the switch-ingress buffers; and
   wherein, in the absence of the data cell associated with the data stream in one of the switch-ingress buffers, the subsequent data cell associated with the data stream is assigned to one of the switch-ingress buffers, which can be an arbitrary one of the switch-ingress buffers.

14. A method for selectively coupling data cells from one or more input nodes to one or more output nodes, comprising:
   receiving data cells on the input nodes;
   storing the data cells in host buffers on a linecard, wherein a given host buffer is coupled to a given input node;
   dynamically assigning the data cells from the host buffers to switch-ingress buffers, wherein the data cells are dynamically assigned from the given host buffer to a given switch-ingress buffer based at least in part on occupancy of the switch-ingress buffers;
   storing the data cells in the switch-ingress buffers; and
   selectively coupling the data cells from the switch-ingress buffers to corresponding output nodes using a switching fabric,
   wherein dynamically assigning the data cells comprises assigning a set of data cells to the given switch-ingress buffer, each data cell in the set of data cells destined for a single corresponding different output node,
   wherein a switch that is physically separate from the linecard includes the switch-ingress buffers and the switching fabric, and wherein the linecard maintains a data structure that maps the given switch-ingress buffer to a set of virtual queues for one or more of the host buffers, wherein an entry for the data structure identifies the set of virtual queues from which the given switch-ingress buffer accepts data cells, wherein if a data cell associated with a data stream is currently in one of the switch-ingress buffers, a subsequent data cell associated with the data stream is dynamically assigned to the one of the switch-ingress buffers; and wherein, in the absence of the data cell associated with the data stream in one of the switch-ingress buffers, the subsequent data cell associated with the data stream is dynamically assigned to one of the switch-ingress buffers, which can be an arbitrary one of the switch-ingress buffers.

15. The system of claim 1, wherein the linecard maintains a second data structure that maps a virtual queue for a host buffer in the set of host buffers to a switch-ingress buffer in the switch-ingress buffers that accepts data cells from the virtual queue.

16. The system of claim 1, wherein the linecard maintains a credit counter for each switch-ingress buffer in the set of switch-ingress buffers.

\* \* \* \* \*